United States Patent
Huang et al.

(10) Patent No.: US 11,757,772 B2
(45) Date of Patent: Sep. 12, 2023

(54) STACKING SWITCH UNIT AND METHOD USED IN STACKING SWITCH UNIT

(71) Applicant: Realtek Semiconductor Corp., HsinChu (TW)

(72) Inventors: Tai-Yi Huang, HsinChu (TW); Ming-Dao Chen, HsinChu (TW); Yu-Yi Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 79 days.

(21) Appl. No.: 17/391,057

(22) Filed: Aug. 2, 2021

(65) Prior Publication Data
US 2022/0247676 A1 Aug. 4, 2022

(30) Foreign Application Priority Data
Feb. 2, 2021 (TW) .................................. 110103892

(51) Int. Cl.
| | |
|---|---|
| *H04L 45/00* | (2022.01) |
| *G06F 15/173* | (2006.01) |
| *H04L 45/58* | (2022.01) |
| *H04L 45/60* | (2022.01) |
| *H04L 49/113* | (2022.01) |
| *H04L 49/112* | (2022.01) |
| *H04L 45/037* | (2022.01) |

(52) U.S. Cl.
CPC .......... *H04L 45/583* (2013.01); *H04L 45/037* (2022.05); *H04L 45/60* (2013.01); *H04L 49/112* (2022.05); *H04L 49/113* (2022.05)

(58) Field of Classification Search
CPC ..... H04L 45/037; H04L 45/583; H04L 45/60; H04L 49/111–113; H04L 49/116; H04L 49/15; H04Q 2213/13039; H04Q 2213/13196
See application file for complete search history.

(56) References Cited

U.S. PATENT DOCUMENTS

| | | | | |
|---|---|---|---|---|
| 6,801,527 B1 * | 10/2004 | O'Keeffe | .............. | H04L 49/103 370/386 |
| 6,801,950 B1 * | 10/2004 | O'Keeffe | .............. | H04L 45/245 370/389 |
| 7,289,496 B2 * | 10/2007 | Donoghue | ............ | H04L 12/433 370/386 |
| 7,483,383 B2 * | 1/2009 | Santoso | .................. | H04L 49/55 370/255 |
| 7,505,403 B2 * | 3/2009 | Santoso | .................. | H04L 49/55 370/386 |
| 7,613,201 B1 * | 11/2009 | Yang | ..................... | H04L 49/102 370/468 |

(Continued)

*Primary Examiner* — Alpus Hsu
(74) *Attorney, Agent, or Firm* — Winston Hsu

(57) ABSTRACT

A method used in a stacking/stackable switch unit includes: providing a plurality of signal ports of the stacking/stackable switch unit, the signal ports having at least one master/slave control port corresponding to at least one operation function of the stacking/stackable switch unit; during a boot-up procedure, automatically determining whether the stacking/stackable switch unit is a master or a slave according to at least one signal level of the at least one master/slave control port and/or content of at least one bit obtained from the at least one master/slave control port.

15 Claims, 5 Drawing Sheets

(56) References Cited

U.S. PATENT DOCUMENTS

| | | | | |
|---|---|---|---|---|
| 7,672,227 | B2* | 3/2010 | Santoso | H04L 43/0817 |
| | | | | 370/242 |
| 8,098,571 | B2* | 1/2012 | Santoso | H04L 45/00 |
| | | | | 370/216 |
| 8,213,420 | B2* | 7/2012 | Donoghue | H04L 12/433 |
| | | | | 370/386 |
| 2005/0105560 | A1* | 5/2005 | Mann | H04L 45/583 |
| | | | | 370/503 |
| 2005/0198373 | A1 | 9/2005 | Saunderson | |
| 2007/0081463 | A1* | 4/2007 | Bohra | H04L 45/583 |
| | | | | 370/252 |
| 2019/0166199 | A1* | 5/2019 | Nagalla | H04L 69/161 |
| 2020/0076921 | A1* | 3/2020 | Hwang | H04L 12/462 |
| 2020/0220929 | A1* | 7/2020 | Nagalla | H04L 69/161 |

* cited by examiner

STACKING SWITCH UNIT AND METHOD USED IN STACKING SWITCH UNIT

BACKGROUND OF THE INVENTION

1. Field of the Invention

The invention relates to a scheme of a switch unit, and more particularly to a stacking switch unit and a method used in the stacking switch unit.

2. Description of the Prior Art

Generally speaking, a conventional switch unit merely allows packet transmissions of its system's bottom layer. If a user needs to control multiple switch units, multiple sets of connection interfaces are correspondingly needed to respectively control the multiple switch units. However, such conventional method requires a large number of connection ports and also occupies a large circuit area for the implementation.

SUMMARY OF THE INVENTION

Therefore one of the objectives of the invention is to provide a stacking switch unit and a corresponding method, to solve the above-mentioned problems.

According to embodiments of the invention, a method used in a stacking switch unit, which is capable of being stacked with at least one other stacking switch unit, is disclosed. The method comprises: providing the stacking switch unit having a plurality of signal ports, the plurality of signal ports comprising at least one master/slave control port; during a boot-up procedure of the stacking switch unit, automatically determining whether the stacking switch unit is a master switch unit or a slave switch unit according to at least one signal level of the at least one master/slave control port and/or content of at least one bit of data obtained from the at least one master/slave control port; and, when the stacking switch unit is the master switch unit, generating a stack configuration setting, and transmitting the stack configuration setting to the at least one other stacking switch unit, which is connected to the stacking switch unit, through at least one signal port among the plurality of signal ports of the stacking switch unit, to make the stacking switch unit complete a stacking connection with the at least one other stacking switch unit.

According to the embodiments, a method used in a stacking switch unit, which is capable of being stacked with at least one other stacking switch unit, is disclosed. The method comprises: providing the stacking switch unit which has a plurality of signal ports, the plurality of signal ports comprising at least one master/slave control port; during a boot-up procedure of the stacking switch unit, automatically determining whether the stacking switch unit is a master switch unit or a slave switch unit according to at least one signal level of the at least one master/slave control port and/or content of at least one bit of data obtained from the at least one master/slave control port; and, when the stacking switch unit is the slave switch unit, receiving a stack configuration setting, generated by a specific master switch unit and/or transferred by another slave switch unit, through at least one of a first signal port and a second signal port of the stacking switch unit, to make the stacking switch unit completes a stacking connection with the specific master switch unit or the another slave switch unit wherein the at least one other stacking switch unit comprises the specific master switch unit and the another slave switch unit.

According to the embodiments, a stacking switch unit capable of being stacked with at least one other stacking switch unit is disclosed. The stacking switch unit comprises a plurality of signal ports and a processing circuit. The plurality of signal ports comprise at least one master/slave control port. The processing circuit is coupled to the plurality of signal ports, and arranged for automatically determining whether the stacking switch unit is a master switch unit or a slave switch unit according to at least one signal level of the at least one master/slave control port and/or content of at least one bit of data obtained from the at least one master/slave control port during a boot-up procedure of the stacking switch unit.

These and other objectives of the present invention will no doubt become obvious to those of ordinary skill in the art after reading the following detailed description of the preferred embodiment that is illustrated in the various figures and drawings.

DETAILED DESCRIPTION

The invention aims to provide a stacking/stackable switch unit such as a network switch unit which is capable of individually and independently executing operation(s) of a network switch and also can be configured to cooperate with one or more switch units so as to form a group of stacked switch units which have the characteristics/behaviors of a single one switch unit/device with more input/output ports (or more pin numbers).

The switch unit in the embodiments of the invention has a plurality of signal ports and for example is a network switch unit having N ports wherein the value of N may be equal to 16 (but not limited). A plurality of switch units such as M switch units can be stacked together to form a single one switch unit. A user can directly use the circuit designs of one or more signal ports/pins of the M switch units or other external circuit designs to determine the stack topology of the M switch units, to thereby implementing and achieving all switch units' automatic connection, automatic decision of master and slave roles, the circuits of the stack topology of the M switch units, and the update of software/firmware programs of the all switch units. The above-mentioned operations can be implemented even if the data/setting of only one switch unit/device is configured.

Figure 1:
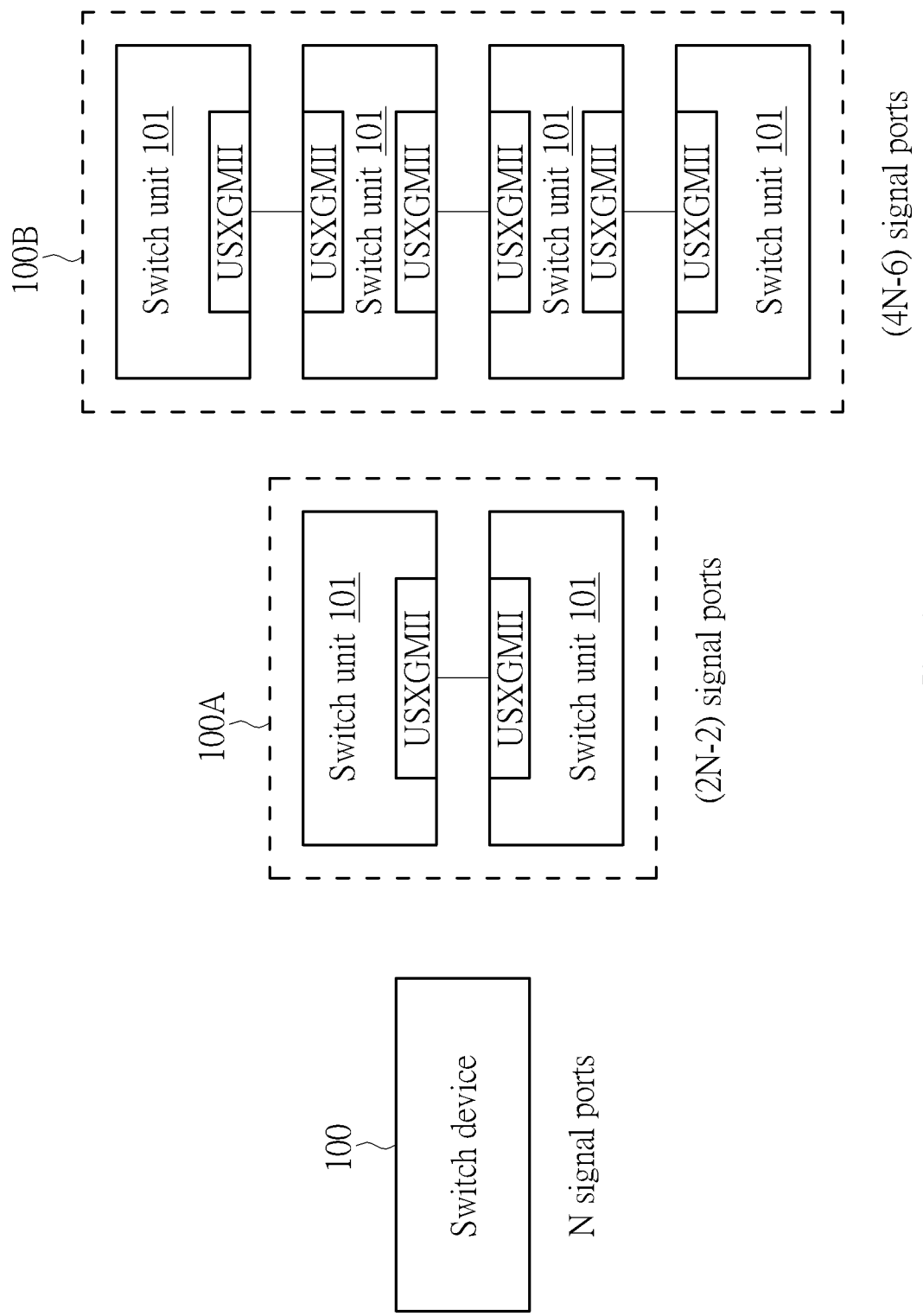
FIG. 1 is a diagram showing one or more switch units according to an embodiment of the invention.

Please refer to FIG. 1. FIG. 1 is a diagram showing one or more switch units according to an embodiment of the invention. As shown in FIG. 1, the switch device 100 comprises a single one switch unit, the switch device 100A comprises M stacking switch units which have been stacked (e.g. two stacked switch units), and the switch device 100B comprises M stacking switch units which have been stacked (e.g. four stacked switch units). It is noted that each of the dotted frames of the switch devices 100A and 100B, as shown in FIG. 1, is used to indicate that a user regards the stacking of the multiple switch units as a single one switch device (or unit) when the user accesses the multiple switch units by an external device. That is, the user's behavior for operating the multiple switch units is similar to that for operating a single one switch unit; in practice, when the user operates the multiple stacked switch units, for example, the two switch units 101 within the switch device 100A (or the four switch units 101 within the switch device 100B) are arranged to cooperate with each other switch unit to implement the operations of automatic connection, determining the relation of master and salve units, the implementation of the stack topology, the update of software/firmware programs of all switch units, the processing of network packet switching, and so on.

Further, a switch unit 101 has N signal ports (or pins). When the switch unit 101 is stacked into at least one another switch unit 101, the switch unit 101 is arranged to perform the stacking connection with the at least one another switch unit 101 by using at least one signal port of the switch unit 101 and a signal port of the at least one another switch unit 101. The communication of the connection interface between the signal ports for example can be implemented by using the USXGMII interface (but not limited). For the switch device 100A, the switch device 100A can use (2N−2) signal ports as input/output ports at most since the switch unit 101 having N signal ports merely uses one signal port to perform the stacking connection with one signal port of another switch unit 101. For the switch device 100B, the switch device 100B can use (4N−6) signal ports as input/output ports at most since merely six signal ports are used for the stacking connection in which two switch units 101 each using one signal port to connect with one switch unit 101 and another two switch units 101 each using two signal ports to connect with other switch units 101. Further, it is noted that, each of the portions of the dotted frames of the switch devices 100A and 100B can be used to indicate that the chip circuits of the multiple switch units are stacked on the corresponding circuit board. However, this is not intended to be a limitation. In other embodiments, multiple switch units after being stacked together can be packaged by integrated circuit packaging to form one chip circuit of a switch device.

Figure 2:
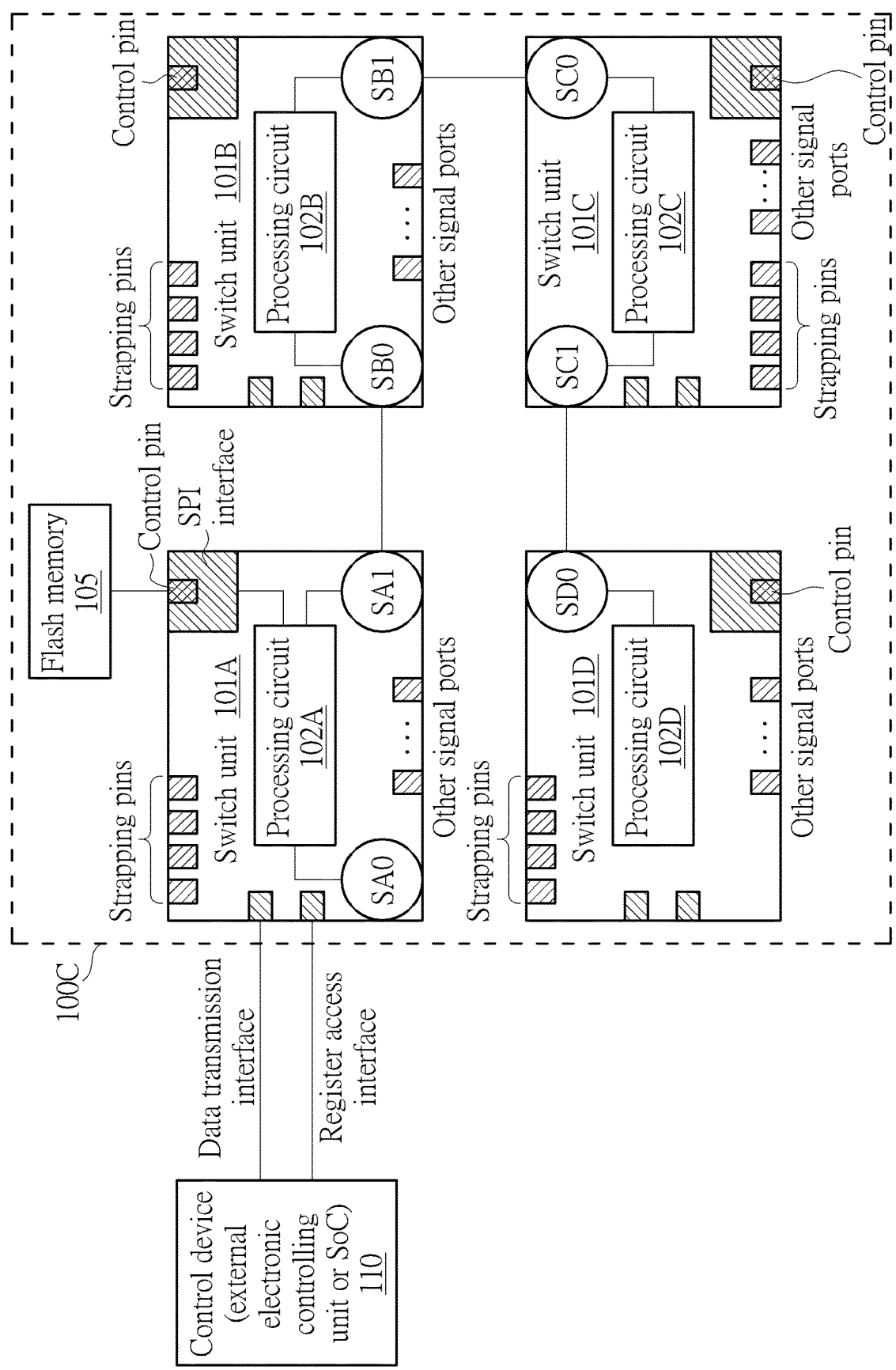
FIG. 2 is a diagram showing an example of one switch device according to an embodiment of the invention.

Please refer to FIG. 2. FIG. 2 is a diagram showing an example of one switch device 100C according to an embodiment of the invention. As shown in FIG. 2, multiple switch units such as four switch units (but the number is not limited) 101A-101D are formed as a stack topology structure to generate and form the switch device 100C. Each switch unit 101A-101D comprises multiple signal ports (or pins) and a processing circuit. For example, a switch unit 101A, used as a master switch unit, comprises the processing circuit 102A, the Serial Peripheral Interface (SPI) formed by employing one signal port to connect with the flash memory 105 which may be an external memory device, a data transmission interface formed by employing another signal port to receive data of a control device 110, a register access interface formed by using one signal port to receive the instruction(s) or command(s) from the control device 110, at least one signal port SA0 and SA1 for the stacking connection, and other signal ports. One of the signal ports SA0 and SA1, e.g. the signal port SA1 (but not limited), is connected to another switch unit such as 101B through the interface such as USXGMII interface (but not limited). The control device 110 for example may be an external electronic controlling unit or a single-chip microcomputer device used for sending command(s) and data to the master switch unit 101A to control data transmission and operation behaviors of the master switch unit 101A and the other slave switch units 101B-101D.

Further, a switch unit 101B, used as a slave switch unit, for example comprises a processing circuit 102B, at least one signal port (e.g. SB0 and SB1) used for the stacking connection, and other signal ports. The signal port SB0 is connected to the signal port SA1 of the master switch unit 101A, and the signal port SB1 for example is connected to the signal port SC0 of another switch unit 101C through the USXGMII interface (but not limited). Further, the switch unit 101C used as another slave switch unit for example comprises a processing circuit 102C, at least one signal port (e.g. SC0 and SC1) used for the stacking connection, and other signal ports. The signal port SC0 is connected to the signal port SB1 of the switch unit 101B, and the signal port SC1 for example is connected to the signal port SD0 of another switch unit 101D through the USXGMII interface (but not limited). Further, a switch unit 101D used as a third slave switch unit for example comprises a processing circuit 102D, at least one signal port (e.g. SD0) used for the stacking connection, and other signal ports.

In this embodiment, it is noted that the switch units 101A-101D are the switch units having the same number of signal ports (or pins), and during a system boot-up procedure (i.e. the boot-up procedure of the switch units 101A-101D), each of the processing circuits 102A-102D of the switch units 101A-101D is respectively arranged to determine the corresponding switch unit operating under the stacking mode is a master switch unit or a slave switch unit according to the signal level(s) at its one or more signal ports (or pins) and/or data stored in a memory (e.g. flash memory 105) which is connected to at least one signal port (or pin). If a switch unit such as the switch unit 101A is used as the master switch unit, then the two signal ports of the master switch unit 101A shown in FIG. 2 are respectively connected to the control device 110 to form the data transmission interface and the register access interface, and it's another signal port is used as the SPI interface to be connected to the flash memory 105. If a switch unit such as switch units 101B-101D is used as the slave switch unit, then the salve switch units 101B-101D as shown in FIG. 2 are disconnected from the control device 110 and the flash memory 105, and each slave switch unit 101B-101D (compared to the master switch unit 101A) further includes three available signal ports which can be further used for other inputs/outputs. It is noted that, the different placements of the signal ports within the switch units 101A-101D are merely used to indicate the connection relation of the stack topology structure, and this is not intended to be a limitation.

In practice, the N signal ports of each switch unit comprise one or more master/slave control ports (or pins). Each switch unit is capable of determining the master or slave role in the switch units by using the signal level(s) at the one or more master/slave control ports and/or received data bits to automatically connect with one or more other switch units, automatically complete the implementation of the stack topology structure, and update software/firmware programs. Accordingly, the user can directly configure the signal level(s) at one or more master/slave control ports of each switch unit and/or configure the received data bits according to an external control circuit or a simplified circuit design when the N switch units are stacked by the user based on a stack topology, and then during the system boot-up procedure the all switch units can be automatically connected to automatically implement the stack topology structure and the update of software/firmware programs.

In the embodiment of the invention, the above-mentioned one or more master/slave control ports (or pins) comprises at least one strapping pin and/or at least one control pin coupled to a circuit such as the flash memory 105. The data stored within the flash memory 105 can be data one-time recorded or burn-in data or can be rewritten. The at least one strapping pin corresponds to at least one specific operation function of a stacking switch unit. The embodiment of at least one strapping pin and at least one control pin of a switch unit, e.g. four strapping pins and the configuration of a one-time programmable (OTP) memory within the switch unit (such configuration is associated the state whether the control pin is coupled to the flash memory 105), is shown in the following table:

| (Select) | (Configure Offset) | (Definition) |
|---|---|---|
| strapping pin | P5_TXD[3] | Use strapping pins to determine the master/slave role of the switch unit when stacking (i.e. whether to enable stacking boot)<br>0: disabled<br>1: enabled |
| | P4_TXD[0] | Use signal port S0 to perform stacking connection<br>0: disabled<br>1: enabled |
| | P4_TXD[1] | Use signal port S1 to perform stacking connection<br>0: disabled<br>1: enabled |
| | P4_TXD[2] | Determine the master/slave role for the stacking<br>1: slave switch unit<br>0: master switch unit |
| OTP | bit 0xC4[7] of address 0xC4 | Select the stacking boot configuration (master or slave, S0/S1 enable or disable) is decided by strapping pin or OTP memory<br>1: strapping pin<br>0: OTP memory |
| | bit 0xC4[2] of address 0xC4 | Use signal port S0 to perform stacking connection<br>1: disabled<br>0: enabled |
| | bit 0xC4[3] of address 0xC4 | Use signal port S1 to perform stacking connection<br>1: disabled<br>0: enabled |
| | bit 0xC4[6] of address 0xC4 | Determine master/slave role for stacking<br>1: master switch unit<br>0: slave switch unit |

As shown in the table, the four strapping pins P5_TXD[3], P4_TXD[0], P4_TXD[1], and P4_TXD[2] of a switch unit are respectively used to indicate whether to use the strapping pins to determine the master/slave role of the switch unit for the stacking, whether to use the first signal port S0 (e.g. signal ports SA0, SB0, SC0, and SD0 of the switch units shown in FIG. 2) for the stacking connection, whether to use the second signal port S1 (e.g. signal ports SA1, SB1, and SC1 of the switch units shown in FIG. 2) for the stacking connection, and the master/slave role for the stacking. For example, when the signal level of the strapping pin P5_TXD[3] is at the first level such as the logical level "0" (but not limited), this indicates that in this situation the strapping pins are not used to determine the switch unit as the master or slave. When the signal level of the strapping pin P5_TXD[3] is at the second level such as the logical level "1" (but not limited), this indicates that in this situation the strapping pins are used to determine the switch unit as the master or slave, and the stacking boot is enabled during boot-up.

When the signal level of the strapping pin P4_TXD[0] is at the first level such as the logic level "0" (but not limited), this indicates that in this situation the first signal port S0 is disabled (not enabled for the stacking connection). When the signal level of the strapping pin P4_TXD[0] is at the second level such as the logic level "1" (but not limited), this indicates that in this situation the first signal port S0 is enabled for the stacking connection. For example, as shown in FIG. 2, the first signal port SA0 of the master switch unit 101A is not enabled for the stacking connection, and therefore the signal level of the strapping pin P4_TXD[0] of the master switch unit 101A is at the first level "0" to indicate that the first signal port SA0 is disabled. In addition, for the slave switch unit 101B in FIG. 2, its first signal port SB0 is used for stacking connection, and therefore the signal level of the strapping pin P4_TXD[0] of the slave switch unit 101B is at the second level "1" to indicate that the first signal port SB0 is enabled.

When the signal level of the strapping pin P4_TXD[1] is at the first level such as the logic level "0" (but not limited), this indicates that in this situation the second signal port S1 is disabled (i.e. not enabled for the stacking connection). When the signal level of the strapping pin P4_TXD[1] is at the second level such as the logic level "1" (but not limited), this indicates that in this situation the second signal port S1 is enabled for the stacking connection. For example, as shown in FIG. 2, the second signal port SA1 of the master switch unit 101A is used for the stacking connection, and therefore the signal level of the strapping pin P4_TXD[1] of the master switch unit 101A is at the second level "1" to indicates that the second signal port SA1 is enabled. In addition, the second signal port SD1 of the slave switch unit 101D in FIG. 2 is not used for the stacking connection, and therefore the signal level of the strapping pin P4_TXD[1] of the slave switch unit 101D is at the first level "0" to indicates that the second signal port SA1 is disabled.

When the signal level of the strapping pin P4_TXD[2] is at the first level such as the logic level "0" (but not limited), this indicates that in this situation the switch unit is determined as a master switch unit. When the signal level of the strapping pin P4_TXD[2] is at the second level such as the logic level "1" (but not limited), this indicates that in this situation the switch unit is determined as a slave switch unit. For example, if the above-mentioned strapping pin is used to determine the master or slave switch unit, then for example the signal level of the strapping pin P4_TXD[2] of the switch unit 101A (as the master switch) in FIG. 2 is to be configured at the first level "0" to indicate that such switch unit is a master switch unit, and the signal level of the strapping pin P4_TXD[2] of the switch unit 101D (as a slave switch) in FIG. 2 is to be configured at the second level "1" to indicate that such switch unit is a slave switch unit.

The above-mentioned control pin for example is connected to the flash memory 105 through the SPI interface in FIG. 2, and the flash memory 105 may use four bits of a specific address 0xC4 (but not limited) to indicate information of the above embodiments wherein the information may comprise the master or slave role and disablement or enablement of signal port(s). For example, the bit 0xC4[7] of the specific address 0xC4 is used to indicate which of the OTP memory or strapping pin is selected and used to determine the master or slave role of the switch unit. When the content of the bit 0xC4[7] is the first data content such as "1" (but not limited), this indicates that in this situation the strapping pin is selected and used to determine the master or slave role. Instead, when the content of the bit 0xC4[7] is the second data content such as "0" (but not limited), this indicates that in this situation the OTP memory is selected and used to determine the master or slave role. Further, the bit 0xC4[2] of the specific address 0xC4 is used to indicate whether to use the first signal port S0 for the stacking connection. For example, when the content of the bit 0xC4[2] is "1", this indicates that in this situation the first signal port S0 is disabled (i.e. not enabled for the stacking connection). Instead, when the content of the bit 0xC4[2] is "0", this indicates that in this situation the first signal port S0 is enabled for the stacking connection. Further, the bit 0xC4[3] of the specific address 0xC4 is used to indicate whether to use the second signal port S1 for the stacking connection. For example, when the content of bit 0xC4[3] is "1", this indicates that in this situation the second signal port S1 is disabled (i.e. not enabled for the stacking connection). Instead, when the content of bit 0xC4[3] is "0", this indicates that in this situation the second signal port S1 is enabled for the stacking connection. For example, the content of bit 0xC4[2] of the address 0xC4, connected to the control pin of the switch unit 101A as shown in FIG. 2, is equal to "1" to indicate that the first signal port SA0 is not enabled for the stacking connection, and the content of bit 0xC4[3] of the such address 0xC4 is equal to "0" to indicate that the second signal port SA1 is enabled for the stacking connection. Further, the bit 0xC4[6] of the address 0xC4 is used to determine the master or slave role of the stacking connection. When the content of bit 0xC4[6] is "0", this indicates that in this situation the switch unit is determined as a master switch unit. Instead, when the content of bit 0xC4[6] is "1", this indicates that in this situation the switch unit is determined as a slave switch unit. For example, the content of bit 0xC4[6] of the address 0xC4, connected to the control pin of the switch unit 101A as shown in FIG. 2, is equal to "1" to indicate that the switch unit 101A is to be configured as the master switch unit.

By doing so, through the above-mentioned one or more control pins (strapping pins and/or control pin) of each switch unit, the user can configure the relation of master/slaves roles of a group of switch units such as 101A-101D by either designing a system-on-chip (SoC) circuit on a circuit board to configure the signal levels of the strapping pins through an input/output interface such as a general-purpose input/output (GPIO) interface or directly using a design of resistors, connected to the ground level, to initialize the configuration of the signal levels of the strapping pins. Accordingly, for the use of the strapping pins, when the group of switch units 101A-101D operate during the system boot-up procedure, each switch unit 101A-101D after entering the stacking mode can respectively and automatically determine itself as a master unit or a slave unit as well as determine the enablement or disablement of signal ports for the stacking connection according to the signal levels of the multiple strapping pins. Then, after the relation of the master or slave roles of the switch units is determined, the processing circuit 102A of the switch unit 101 as the master switch can transmit data or program codes to the processing circuit 102B of the next switch unit 101B (i.e. a slave switch), and then the processing circuit 102B of the slave switch unit 101B can transfer the data or program codes to the processing circuit 102C of another next switch unit 101C (i.e. a slave switch). For example, finally, the processing circuit 102C of the slave switch unit 101C can transfer the data or program codes to the processing circuit 102D of the last one slave switch unit 101D.

Further, for the use of the control pin, the switch unit 101A for example can use the control pin to obtain the bits of the address 0xC4 to determine that it is used as the master switch unit and to determine which signal port(s) is/are used for the stacking connection. In addition, the switch unit 101A can retrieve the stacking binary file and other corresponding software/firmware programs from the flash memory 105 through the control pin. Accordingly, the master switch unit 101A can transmit the retrieved binary file and other corresponding software/firmware programs to the connected slave switch unit 101B, and then the binary file and other corresponding software/firmware programs can be sequentially transferred to the other slave switch units 101C-101D stage by stage, so that all the master or slave switch units can obtain stack configuration settings and corresponding software/firmware programs during the system boot-up procedure.

Figure 3:
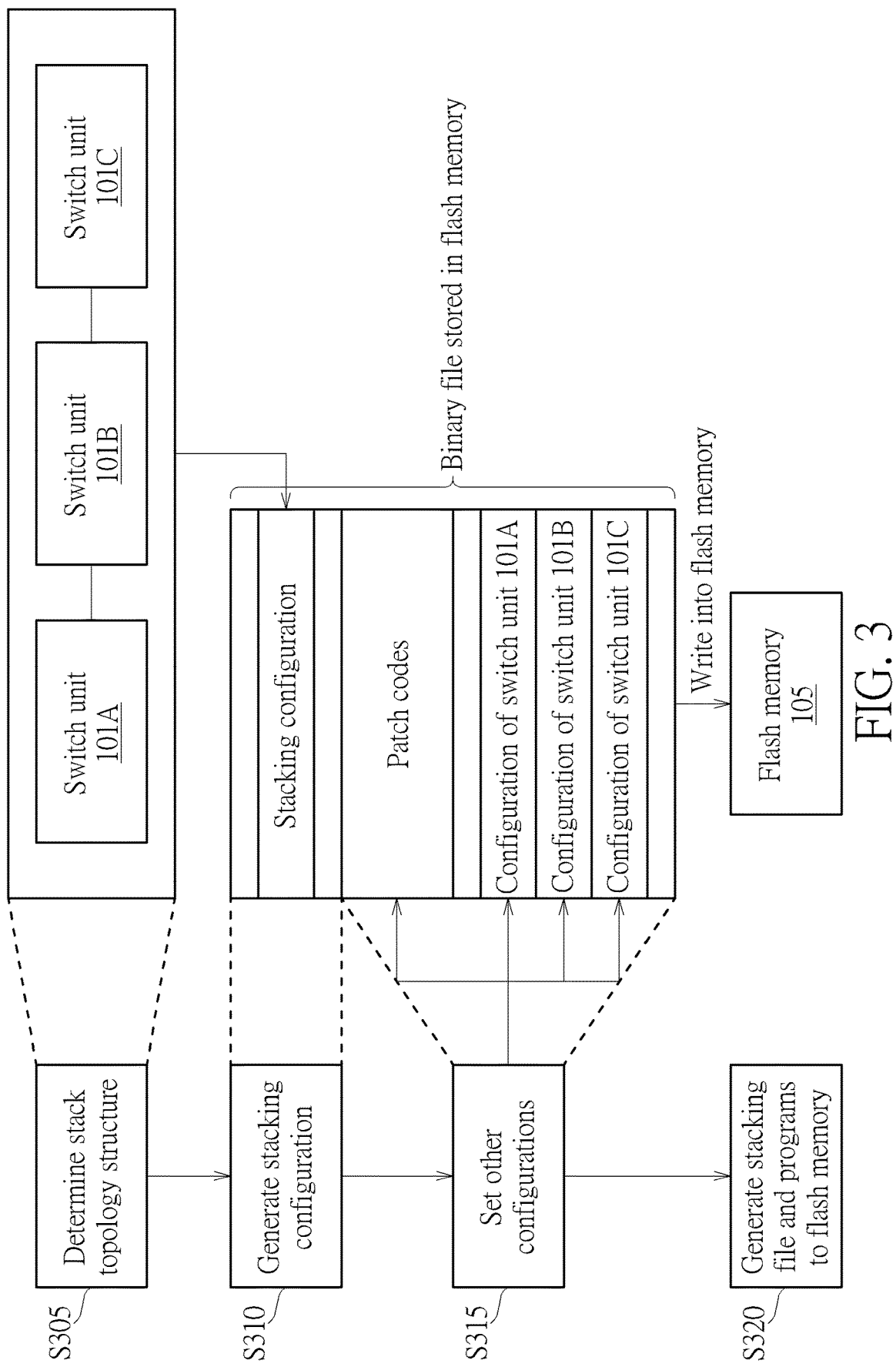
FIG. 3 is a diagram illustrating the flowchart of the method for generating and storing the stacking file and programs into the flash memory according to an embodiment of the invention.

Please refer to FIG. 3. FIG. 3 is a diagram illustrating the flowchart of the method for generating and storing the stacking file and programs into the flash memory 105 according to an embodiment of the invention. It is noted that steps in the flowchart of the method can be executed by the manufacturer which provides/produces the switch units or can be executed by a user. In other words, generating the stacking file and programs can be executed at the factory of the manufacturer or can be executed by the device of the user; this is not intended to be a limitation of the invention. As shown in FIG. 3, in Step S305, the manufacturer or the user can use an electronic device such as a computer device or other control devices to determine the stack topology structure. For example, the manufacturer may customize the stack topology structure in accordance with the user's requirements. For example, the customized stack topology structure may comprise three switch units in which the switch unit 101A is the master switch and the switch units 101B-101C are slave switches. Alternatively, in another embodiment, the user may determine the stack topology structure by himself or herself and configuring the circuit designs for the signal levels of the above-mentioned control port(s) on a circuit board wherein the switch unit 101A for example is configured as the master switch by the user and the switch units 101B-101C are configured as slave switches. In Step S310, the manufacturer or the user may use the electronic device such as the computer device to generate the setting of the stacking configuration. Then, in Step S315, the manufacturer or user may use the electronic device such as the computer device to configure the settings of other configurations such as patch codes, the configuration of master switch unit 101A, the configurations of slave switch units 101B-101C, software/firmware programs, data settings, and so on. Finally, in Step S320, the manufacturer or user may use the electronic device such as the computer device to generate and write the stacking file and corresponding programs into the flash memory 105 wherein the stacking file and corresponding programs include data of the setting of stacking configuration, patch codes, and other settings of configurations of master/slave switch unit(s).

Figure 4:
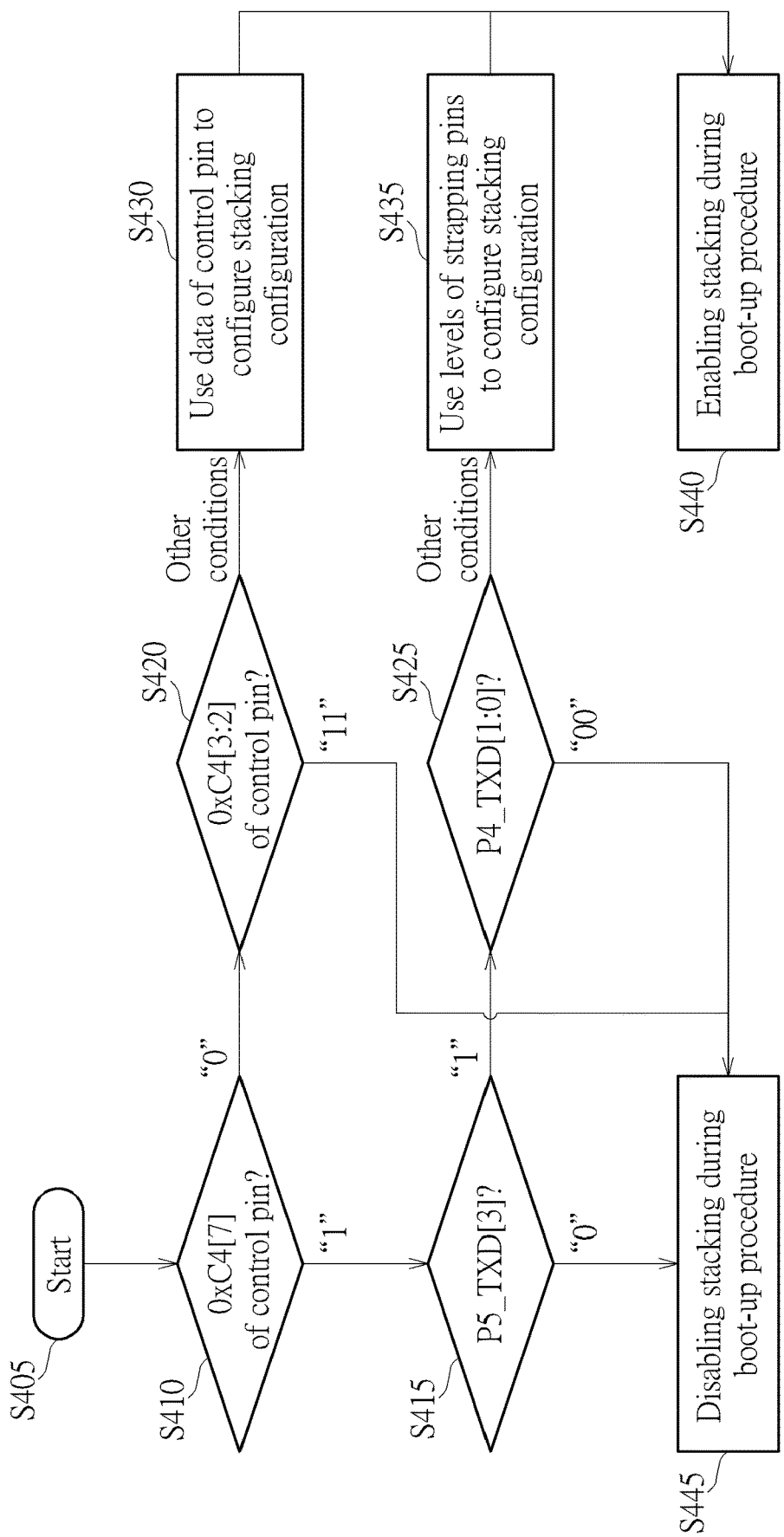
FIG. 4 is a diagram of the flowchart of the method for determining a switch unit as a master/slave switch unit during the system boot-up procedure according to an embodiment of the invention.

Please refer to FIG. 4. FIG. 4 is a diagram of the flowchart of the method for determining a switch unit as a master/slave switch unit during the system boot-up procedure according to an embodiment of the invention. In Step S405, when the switch unit enters the stacking mode, the steps in the flowchart of the method begin. In Step S410, the switch unit obtains the data content of bits of the address 0xC4 within an external memory device from the control pin; the corresponding operations and following operations are performs by referring to the configurations/definitions of pins in the tables of the previous paragraphs. For example, if the bit 0xC4[7] indicates "0", this indicates that the control pin is used to determine the mater/slave role and then the flow proceeds to Step S420. Instead, if the bit 0xC4[7] indicates "1", this indicates that the strapping pin is used to determine the master/slave role and then the flow proceeds to Step S415. In Step S415, the switch unit is arranged to determine at which level the signal level of the strapping pin P5_TXD [3] is configured. If the switch unit determines that the signal level of the strapping pin P5_TXD[3] is at logic level "0", then the stacking boot of strapping pins is disabled. Instead, if the signal level of the strapping pin P5_TXD[3] is at the logic level "1", then the stacking boot of strapping pins is enabled. In other words, if the bit 0xC4[7] indicates "1" as well as the signal level of the strapping pin P5_TXD[3] is at the logic level "0", this indicates that neither the control pin nor strapping pin is used to determine the stack topology structure. That is, in this situation, the stack topology structure is disabled during the system is powered on, and the flow proceeds to Step S445. In Step S420, if both the two bits 0xC4[3:2] obtained from the control pin indicate "1", this indicates that the first signal port S0 and second signal port S1 are disabled for the stacking connection. In other words, if the bit 0xC4[7] indicates "0" and each of the bits 0xC4[3:2] indicate "1", then in this situation during the system boot-up procedure the stack topology structure is disabled, and the flow proceeds to Step S445. If any of the two bits 0xC4[3:2] does not indicate "1", the flow proceeds to Step S430. The data obtained from the control pin is utilized to set the stacking configuration, and then the flow proceeds to Step S440 and the stack topology structure is activated and the execution of the stacking mode is completed.

In Step S425, if both the signal levels of the two strapping pins P4_TXD[1:0] indicate "0", this indicates that the first signal port S0 and second signal port S1 are disabled for the stacking connection. In other words, if the signal level of the strapping pin P5_TXD[3] is at the logic level "1" but both the signal levels of the two strapping pins P4_TXD[1:0] are at the logic level "0", then in this situation the stack topology structure is disabled during the system boot-up procedure, and the flow proceeds to Step S445. If any of the signal levels of the two strapping pins P4_TXD[1:0] is not at the logic level "0", the flow proceeds to Step S435 and the signal levels of the strapping pins are used to set the stacking configuration, and then the flow proceeds to Step S440 to activate the stack topology structure and complete the stacking mode. It is noted that steps of the flowchart in FIG. 4 may be executed by a processing circuit within a switch unit.

Figure 5:
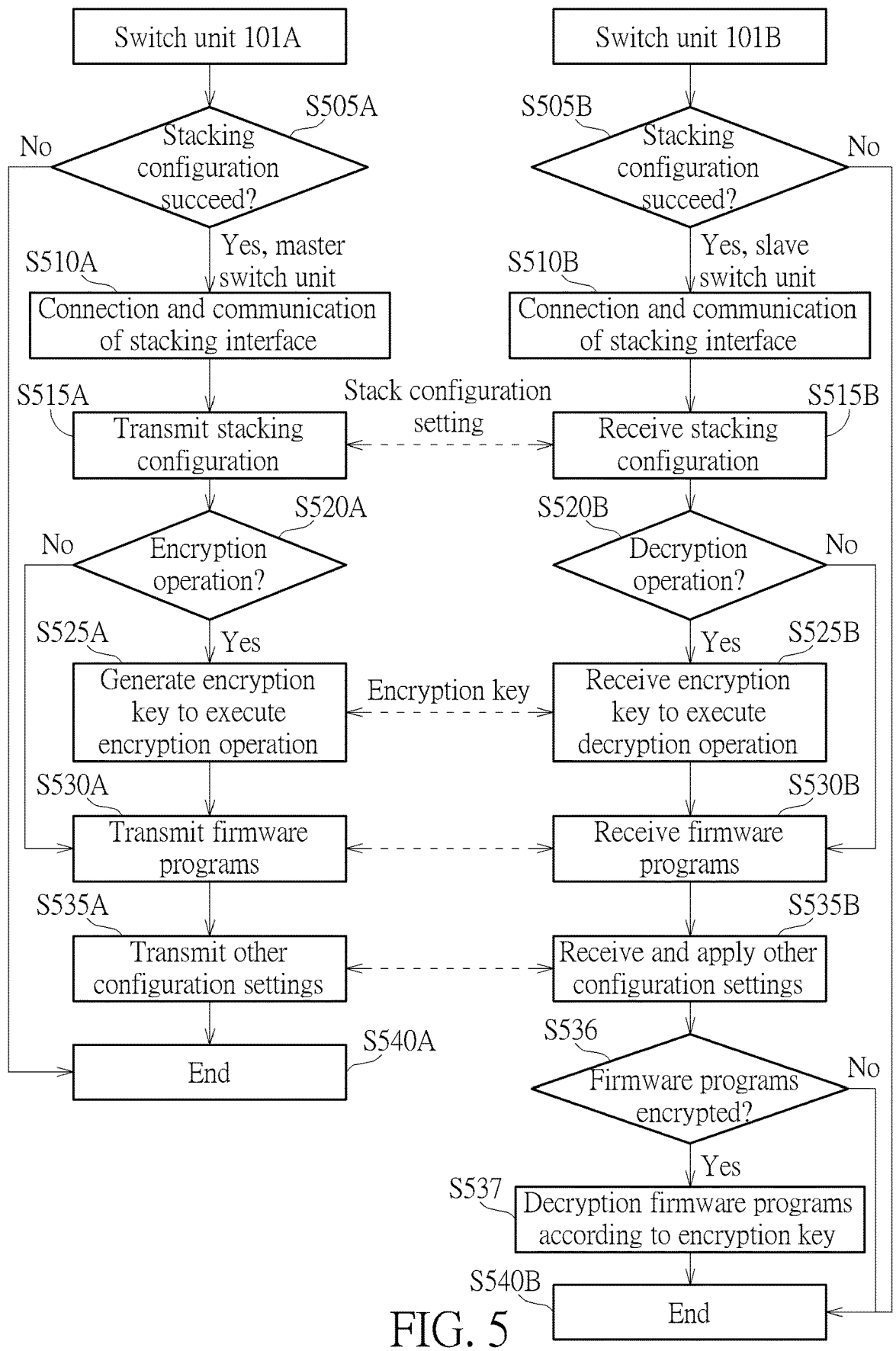
FIG. 5 is a diagram of a flowchart of the operation and communication of two switch units to be stacked during the system boot-up procedure according to an embodiment of the invention.

Please refer to FIG. 5. FIG. 5 is a diagram of a flowchart of the operation and communication of two switch units to be stacked during the system boot-up procedure according to an embodiment of the invention. As shown in FIG. 5, the two switch units 101A and 101B in FIG. 2 are used to describe the operations of FIG. 5; however, this is not intended to be a limitation. During the execution of the system boot-up procedure, the switch units 101A and 101B enter the stacking mode, and in this situation the operation flow of the switch unit 101A enters Step S505A and the operation flow of the switch unit 101B enters Step S505B. In Step S505A, the switch unit 101A executes the stacking setting of the boot-up procedure and in this example is configured as a master switch unit. If the configuration succeeds, the flow proceeds to Step S510A; instead, if the configuration fails, then the flow proceeds to Step S540A and the flow ends. In Step S505B, the switch unit also executes the stacking setting of the boot-up procedure and in this example is configured as a slave switch unit. If the configuration succeeds, the flow proceeds to Step S510B; instead, if the configuration fails, then the flow proceeds to Step S540B and the flow ends.

In Step S510A, the master switch unit 101A performs the connection and communication of the stacking interface, and similarly in Step S510B the slave switch unit 101B also performs the connection and communication of the stacking interface. Thus, in Step S515A and Step S515B, the master switch unit 101A transmits the stacking configuration setting to at least one slave switch unit which is connected to the master switch unit 101A, e.g. the slave switch unit 101B. Correspondingly, the slave switch unit 101B receives the stacking configuration setting from at least one master or slave switch unit which is connected to the slave switch unit 101B, e.g. the master switch unit 101A in this embodiment. It is noted that the master switch unit 101A can generate the stack configuration setting according to data stored by the flash memory 105 or can obtain the stack configuration setting by downloading the stack configuration setting from the flash memory 105.

In Step S520A and Step S520B, the master switch unit 101A and slave switch unit 101B respectively determine whether to transmit data through the encryption/decryption operation. If it is determined that the data is transmitted through the encryption/decryption operation, then in Step S525A and Step S525B the master switch unit 101A is arranged to generate the encryption key and sends the encryption key to at least one slave switch unit which is connected to the master switch unit 101A, e.g. the slave switch unit 101B, and the slave switch unit 101B is arranged to receive the encryption key from at least one switch unit, which is connected to the slave switch unit 101B and can be a master or slave switch unit, so as to perform the subsequent decryption operation. Then, the flow proceeds to Step S530A and Step S530B. In Step S520A and Step S520B, if it is determined that the data is not transmitted through encryption operation, then the flow directly proceeds to Step S530A and Step S530B.

The master switch unit 101A in Step S530A is arranged to transmit firmware programs to at least one slave switch unit, which is connected to the master switch unit 101A, e.g. the slave switch unit 101B, wherein the firmware programs may be obtained from the flash memory 105. The slave switch unit 101B in Step S530B is arranged to receive the firmware programs from at least master or slave switch unit which is connected to the slave switch unit 101B and to update its firmware programs based on the received firmware programs. It is understood that in Step S530A the master switch unit 101A uses the encryption key to encrypt the firmware programs and then transmit the encrypted firmware programs to the slave switch unit if the master switch unit 101A in Step S520A determines that the data transmission is performed through the encryption operation. If the master switch unit 101A in Step S520A determines that the data transmission is performed not through the encryption operation, then in Step S530A the master switch unit 101A can directly transmit the unencrypted firmware programs to the slave switch unit.

Then, the master switch unit 101A in Step S535A is arranged to transmit other configuration settings to the at least one connected slave switch unit such as the slave switch unit 101B, and the slave switch unit 101B in Step S535B is arranged to receive the other configuration settings from the at least one connected master or slave switch unit and apply the other configuration settings to the settings of the slave switch unit 101B. In S520A and Step S520B, if the master switch unit 101A and slave switch unit 101B respectively determines that the data transmission is performed through the encryption operation, then the transmissions of the other configuration settings are performed through the corresponding encryption/decryption operations in Step S535A and Step S535B. In S520A and Step S520B, if it is determined that the data transmission is performed not through the encryption operation, then in Step S535A and Step S535B the transmissions of the other configuration settings are performed not through the corresponding encryption/decryption operations.

The master switch unit 101A in Step S540A completes its flowchart steps of the execution of the stacking mode. The slave switch unit 101B in Step S536 can further determine whether the firmware programs are encrypted. If it is determined the firmware programs are encrypted, then the flow proceeds to Step S537. In Step S537, the slave switch unit 101B is arranged to decrypt the encrypted firmware programs according to the previously received encryption key so that the decrypted firmware programs can be applied into and used by the slave switch unit 101B to update the original firmware programs of the slave switch unit 101B. Instead, if it is determined the firmware programs are not encrypted, then the flow proceeds to Step S540B, and in Step S540B the slave switch unit 101B completes the flowchart steps for the execution of the stacking mode. In an embodiment, each switch unit comprises default firmware programs. When updating the firmware programs, the switch unit is arranged to decrypt an updated version of firmware programs in Step S537 according to the encryption key if the updated version of firmware programs from a master switch unit has been encrypted.

It is noted that the steps in the flowchart of FIG. 5 are respectively executed by the processing circuit 102A of the switch unit 101A and processing circuit 102B of the switch unit 101B.

It is understood that the above-mentioned examples and embodiments are used for illustrative purposes and not meant intended to be limitations of the invention. In some embodiments, the master switch unit 101A can exchange encryption keys with each of the slave switch units 101B-101D one by one, so that each of the slave switch units 101B-101D may possess a different encryption key and thus other slave switch units (e.g. the others of slave switch units 101B-101D) cannot decrypt the data transmission from the master switch unit 101A to one of the slave switch units 101B-101D. For example, information of a particular switch unit cannot be hacked by other switch units. It is noted that in one embodiment the information of firmware programs transmitted to one slave switch unit can be obtained by other slave switch units, and the master switch unit 101A and slave switch units 101B-101D all use the same encryption key to encrypt or decrypt the firmware programs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method used in a stacking switch unit which is capable of being stacked with at least one other stacking switch unit, comprising:

providing the stacking switch unit having a plurality of signal ports, the plurality of signal ports comprising at least one specific signal port, the at least one specific signal port comprising at least one strapping pin or at least one control pin and the at least one specific signal port being arranged for determining a master/slave role of the stacking switch unit when the stacking switch unit operating under a stacking mode;

operating under the stacking mode during a boot-up procedure of the stacking switch unit, automatically determining whether the stacking switch unit is a master switch unit or a slave switch unit according to at least one signal level of the at least one specific signal port or content of at least one bit of data obtained from the at least one specific signal port; and when the stacking switch unit is the master switch unit, generating a stack configuration setting, and transmitting the stack configuration setting to the at least one other stacking switch unit, which is connected to the stacking switch unit, through at least one of a first signal port and a second signal port among the plurality of signal ports of the stacking switch unit, to make the stacking switch unit complete a stacking connection with the at least one other stacking switch unit.

2. The method of claim 1, further comprising:

during the boot-up procedure executed by the stacking switch unit, determining whether to use a first signal port and a second signal port of the stacking switch unit for the stacking connection according to the at least one signal level of the at least one specific signal port or the content of the at least one bit of the data obtained from the at least one specific signal port.

3. The method of claim 1, further comprising:

when the stacking switch unit is the slave switch unit, receiving a stack configuration setting, generated by a specific master switch unit or transferred by another slave switch unit, through a first signal port of the stacking switch unit, to make the stacking switch unit complete the stacking connection with the specific master switch unit or the another slave switch unit.

4. The method of claim 1, further comprising:

when the stacking switch unit completes the stacking connection with the at least one other stacking switch unit, transmitting a firmware program of the stacking switch unit to the at least one other stacking switch unit through the at least one of the first signal port and the second signal port of the stacking switch unit to make the stacking switch unit and the at least one other stacking switch unit have the identical firmware program.

5. The method of claim 1, wherein the at least one specific signal port comprises a plurality of strapping pins which comprise:

a first strapping pin, for determining whether to use the plurality of strapping pins to determine the stacking switch unit as the master switch unit or as the slave switch unit, the first strapping pin at a first level being used to indicate not using the plurality of strapping pins and the first strapping pin at a second level being used to indicate using the plurality of strapping pins;

a second strapping pin, for determining whether a first signal port of the stacking switch unit is enabled, the second strapping pin at the first level being used to indicate that the first signal port is disabled and the second strapping pin at the second level being used to indicate that the first signal port is enabled;

a third strapping pin, for determining whether a second signal port of the stacking switch unit is enabled, the third strapping pin at the first level being used to indicate that the second signal port is disabled and the third strapping pin at the second level being used to indicate that the second signal port is enabled; and a fourth strapping pin, for determining whether the stacking switch unit is the master switch unit or the slave switch unit, the fourth strapping pin at the first level being used to indicate that the stacking switch unit is the master switch unit and the fourth strapping pin at the second level being used to indicate that the stacking switch unit is the slave switch unit.

6. The method of claim 1, wherein the stacking switch unit is externally coupled to a flash memory device, the at least one specific signal port comprises at least one control pin coupled to the flash memory device, the at least one control pin is used for reading out specific data stored at a specific address within the flash memory device, and the specific data comprises:

a first bit, for determining whether to use a plurality of strapping pins included by the at least one specific signal port to determine the stacking switch unit as the master switch unit or as the slave switch unit, the first bit indicating a first data content being used to indicate using the plurality of strapping pins and the first bit indicating a second data content being used to indicate using the at least one control pin;

a second bit, for determining whether a first signal port of the stacking switch unit is enabled, the second bit indicating the first data content being used to indicate that the first signal port is disabled and the second bit indicating the second data content being used to indicate that the first signal port is enabled;

a third bit, foe determining whether a second signal port of the stacking switch unit is enabled, the third bit indicating the first data content being used to indicate that the second signal port is disabled and the third bit indicating the second data content being used to indicate that the second signal port is enabled; and a fourth bit, for determining the master/slave role of the stacking switch unit, the fourth bit indicating the first data content being used to indicate that the stacking switch unit is a master role and the fourth bit indicating the second data content being used to indicate that the stacking switch unit is a slave role.

7. A method used in a stacking switch unit which is capable of being stacked with at least one other stacking switch unit, comprising:

providing the stacking switch unit which has a plurality of signal ports, the plurality of signal ports comprising at least one specific signal port, the at least one specific signal port comprising at least one strapping pin or at least one control pin and the at least one specific signal port being arranged for determining a master/slave role of the stacking switch unit when the stacking switch unit operating under a stacking mode;

operating under the stacking mode during a boot-up procedure of the stacking switch unit, automatically determining whether the stacking switch unit is a master switch unit or a slave switch unit according to at least one signal level of the at least one specific signal port or content of at least one bit of data obtained from the at least one specific signal port; and when the stacking switch unit is the slave switch unit, receiving a stack configuration setting, generated by a specific master switch unit or transferred by another slave switch unit, through at least one of a first signal port and a second signal port of the stacking switch unit, to make the stacking switch unit completes a stacking connection with the specific master switch unit or the another slave switch unit wherein the at least one other stacking switch unit comprises the specific master switch unit and the another slave switch unit.

8. A stacking switch unit capable of being stacked with at least one other stacking switch unit, comprising:

a plurality of signal ports which comprises at least one specific signal port, the at least one specific signal port comprising at least one strapping pin or at least one control pin and the at least one specific signal port being arranged for determining a master/slave role of the stacking switch unit when the stacking switch unit operating under a stacking mode; and a processing circuit, coupled to the plurality of signal ports, for:

operating under the stacking mode during a boot-up procedure of the stacking switch unit, automatically determining whether the stacking switch unit is a master switch unit or a slave switch unit according to at least one signal level of the at least one specific signal port or content of at least one bit of data obtained from the at least one specific signal port.

9. The stacking switch unit of claim 8, wherein, when the stacking switch unit is the master switch unit, the processing circuit is used for generating a stack configuration setting and transmitting the stack configuration setting to the at least one other stacking switch unit, which is connected to the stacking switch unit, through at least one of a first signal port and a second signal port among the plurality of signal ports of the stacking switch unit, to make the stacking switch unit complete a stacking connection with the at least one other stacking switch unit.

10. The stacking switch unit of claim 8, wherein, during the boot-up procedure of the stacking switch unit, the processing circuit is used for determining whether to use a first signal port and a second signal port of the stacking switch unit for the stacking connection according to the at least one signal level of the at least one specific signal port or the content of the at least one bit of the data obtained from the at least one specific signal port.

11. The stacking switch unit of claim 8, wherein, when the stacking switch unit is the slave switch unit, the stacking switch unit is arranged for receiving a stack configuration setting, generated by a specific master switch unit or transferred by another slave switch unit, through a first signal port of the slave switch unit, to make the stacking switch unit complete the stacking connection with the specific master switch unit or the another slave switch unit.

12. The stacking switch unit of claim 8, wherein, when the stacking switch unit completes the stacking connection with the at least one other switch unit, the stacking switch unit is arranged for transmitting a firmware program of the stacking switch unit to the at least one other switch unit through the at least one of the first signal port and the second signal port of the stacking switch unit, to make the stacking switch unit and the at least one other switch unit have the identical firmware program.

13. The stacking switch unit of claim 8, wherein the at least one specific signal port comprises a plurality of strapping pins which comprises:

a first strapping pin, for determining whether to use the plurality of strapping pins to determine the stacking switch unit as the master switch unit or as the slave switch unit, the first strapping pin at a first level being used to indicate not using the plurality of strapping pins and the first strapping pin at a second level being used to indicate using the plurality of strapping pins;

a second strapping pin, for determining whether a first signal port of the stacking switch unit is enabled, the second strapping pin at the first level being used to indicate that the first signal port is disabled and the second strapping pin at the second level being used to indicate that the first signal port is enabled;

a third strapping pin, for determining whether a second signal port of the stacking switch unit is enabled, the third strapping pin at the first level being used to indicate that the second signal port is disabled and the third strapping pin at the second level being used to indicate that the second signal port is enabled; and a fourth strapping pin, for determining the master/slave role of the stacking switch unit, the fourth strapping pin at the first level being used to indicate a master role and the fourth strapping pin at the second level being used to indicate a slave role.

14. The stacking switch unit of claim 8, wherein the stacking switch unit is externally coupled to a flash memory device, the at least one specific signal port comprises at least one control pin coupled to the flash memory device, the at least one control pin is used for reading out specific data stored at a specific address within the flash memory device, and the specific data comprises:

a first bit, for determining whether to use a plurality of strapping pins included by the at least one specific signal port to determine the stacking switch unit as the master switch unit or as the slave switch unit, the first bit indicating a first data content being used to indicate using the plurality of strapping pins and the first bit indicating a second data content being used to indicate using the at least one control pin;

a second bit, for determining whether a first signal port of the stacking switch unit is enabled, the second bit indicating the first data content being used to indicate that the first signal port is disabled and the second bit indicating the second data content being used to indicate that the first signal port is enabled;

a third bit, foe determining whether a second signal port of the stacking switch unit is enabled, the third bit indicating the first data content being used to indicate that the second signal port is disabled and the third bit indicating the second data content being used to indicate that the second signal port is enabled; and a fourth bit, for determining the master/slave role of the stacking switch unit, the fourth bit indicating the first data content being used to indicate that the stacking switch unit is a master role and the fourth bit indicating the second data content being used to indicate that the stacking switch unit is a slave role.

15. The stacking switch unit of claim 8, wherein, when the stacking switch unit is the slave switch unit, the processing circuit is arranged for receiving a stack configuration setting, generated by a specific master switch unit or transferred by another slave switch unit, through at least one of a first signal port and a second signal port of the stacking switch unit, to make the stacking switch unit complete a stacking connection with the specific master switch unit or the another slave switch unit; and, the at least one other stacking switch unit comprises the specific master switch unit and the another slave switch unit.

\* \* \* \* \*